(12) United States Patent
Zimet

(10) Patent No.: US 7,946,526 B2
(45) Date of Patent: May 24, 2011

(54) ROTARY-WING VEHICLE SYSTEM

(75) Inventor: Nachman Zimet, Tel Aviv (IL)

(73) Assignees: Nachman Zimet, Tel Aviv (IL); Avner Divon, Rosh Haayin (IL)

( * ) Notice: Subject to any disclaimer, the term of this patent is extended or adjusted under 35 U.S.C. 154(b) by 400 days.

(21) Appl. No.: 11/263,903

(22) Filed: Nov. 2, 2005

(65) Prior Publication Data

US 2006/0231677 A1 Oct. 19, 2006

Related U.S. Application Data

(60) Provisional application No. 60/624,941, filed on Nov. 5, 2004.

(51) Int. Cl.
*B64C 27/82* (2006.01)
*B64C 27/10* (2006.01)
*A63H 27/133* (2006.01)

(52) U.S. Cl. ............... 244/17.19; 244/17.23; 446/37

(58) Field of Classification Search ............... 244/17.11, 244/17.19, 17.21, 17.23, 110 D; 446/36, 446/37
See application file for complete search history.

(56) References Cited

U.S. PATENT DOCUMENTS

| | | | | |
|---|---|---|---|---|
| 1,824,195 A | * | 9/1931 | Chillingworth | 416/171 |
| 1,848,389 A | * | 3/1932 | Sikorsky | 244/6 |
| 2,096,599 A | * | 10/1937 | Thomas | 244/6 |
| 2,414,435 A | * | 1/1947 | Bendix | 416/24 |
| 2,466,821 A | * | 4/1949 | Owen | 244/17.17 |
| 2,469,144 A | | 5/1949 | Baggott | |
| 2,487,020 A | | 11/1949 | Gilcrease | |
| 2,598,349 A | | 5/1952 | Carrington | |
| 2,646,848 A | * | 7/1953 | Young | 416/18 |
| 2,665,859 A | * | 1/1954 | Papadakos | 244/7 R |
| 2,749,059 A | * | 6/1956 | Meyers et al. | 244/7 R |
| 2,950,074 A | | 8/1960 | Apostolescu | |
| 3,029,048 A | * | 4/1962 | Brooks et al. | 244/17.19 |
| 3,417,825 A | * | 12/1968 | Ramme | 416/20 R |
| 3,432,119 A | * | 3/1969 | Miller | 244/6 |
| 3,448,946 A | * | 6/1969 | Nagatsu | 244/17.19 |
| 3,554,467 A | | 1/1971 | Yowell | |

(Continued)

FOREIGN PATENT DOCUMENTS

DE 102 03 504 7/2003

(Continued)

OTHER PUBLICATIONS

"Air Hogs R/C Reflex Instructions" Spin Master Ltd., unknown date, available at http://www.spinmaster.com/files/instructions/AH_Reflex_Micro_Heli.pdf.*

(Continued)

*Primary Examiner* — Timothy D Collins
*Assistant Examiner* — Joseph W Sanderson
(74) *Attorney, Agent, or Firm* — Cohen Pontani Lieberman & Pavane LLP

(57) ABSTRACT

A rotary-wing apparatus that is aeronautically stable, easy to fly with a multidimensional control, small size, and safe to fly and low cost to produce. The rotary-wing apparatus includes a coaxial, counter rotating rotor drive providing lifting power with an inherent aeronautical stability; auxiliary propellers that face the direction of flight and are located on opposite sides of said coaxial rotary-wing apparatus and enable flying forwards, backwards and perform yawing. The rotary-wing coaxial helicopter toy is remotely controlled and safe to fly in doors and out doors, while performing exciting maneuvers even by untrained kids.

21 Claims, 12 Drawing Sheets

U.S. PATENT DOCUMENTS

| | | | | |
|---|---|---|---|---|
| 3,558,081 | A * | 1/1971 | Williams | 244/17.19 |
| 3,794,273 | A * | 2/1974 | Girard | 244/7 A |
| 3,870,251 | A * | 3/1975 | Breuner | 244/17.21 |
| D234,686 | S * | 4/1975 | Seibel | D12/327 |
| 4,084,345 | A | 4/1978 | Tamaka | |
| 4,531,692 | A | 7/1985 | Mateus | |
| 4,598,887 | A * | 7/1986 | Jordan | 244/17.11 |
| 5,240,204 | A * | 8/1993 | Kunz | 244/6 |
| 5,252,100 | A | 10/1993 | Osawa et al. | |
| 5,297,759 | A | 3/1994 | Tilbor et al. | |
| 5,330,131 | A * | 7/1994 | Burcham et al. | 244/76 R |
| 5,374,010 | A * | 12/1994 | Stone et al. | 244/12.5 |
| 5,791,592 | A | 8/1998 | Nolan et al. | 244/17.11 |
| 5,873,545 | A * | 2/1999 | Kapin et al. | 244/12.3 |
| 5,971,320 | A | 10/1999 | Jermyn et al. | |
| 6,000,911 | A * | 12/1999 | Toulmay et al. | 416/223 R |
| 6,086,016 | A | 7/2000 | Meek | |
| 6,102,330 | A | 8/2000 | Burken et al. | 244/76 R |
| 6,182,923 | B1 * | 2/2001 | Weinhart | 244/17.25 |
| 6,293,492 | B1 * | 9/2001 | Yanagisawa | 244/17.25 |
| 6,450,446 | B1 | 9/2002 | Holben | |
| 6,460,802 | B1 | 10/2002 | Norris | |
| D465,196 | S | 11/2002 | Dammar | |
| 6,513,752 | B2 * | 2/2003 | Carter, Jr. | 244/8 |
| 6,568,634 | B2 | 5/2003 | Smith | |
| 6,568,980 | B2 | 5/2003 | Barthold | |
| 6,616,094 | B2 | 9/2003 | Illingworth | |
| 6,659,395 | B2 | 12/2003 | Rehkemper et al. | |
| 6,688,936 | B2 | 2/2004 | Davis | |
| 6,695,253 | B1 * | 2/2004 | Romani et al. | 244/6 |
| 6,802,693 | B2 | 10/2004 | Reinfeld et al. | |
| 6,811,460 | B1 | 11/2004 | Tilbor et al. | |
| 6,824,094 | B2 | 11/2004 | Richard | |
| 6,843,699 | B2 | 1/2005 | Davis | |
| D503,198 | S | 3/2005 | Rehkemper et al. | |
| 6,886,777 | B2 | 5/2005 | Rock | |
| 6,899,586 | B2 | 5/2005 | Davis | |
| 7,036,768 | B2 * | 5/2006 | Bundo | 244/5 |
| 7,083,142 | B2 * | 8/2006 | Scott | 244/17.13 |
| 7,198,223 | B2 * | 4/2007 | Phelps et al. | 244/17.11 |
| 7,267,300 | B2 * | 9/2007 | Heath et al. | 244/12.3 |
| 2002/0109044 | A1 | 8/2002 | Rock | |
| 2002/0125368 | A1 | 9/2002 | Phelps, III et al. | |
| 2004/0007644 | A1 * | 1/2004 | Phelps et al. | 244/17.11 |
| 2005/0098682 | A1 | 5/2005 | Pai | 244/17.11 |
| 2005/0121553 | A1 * | 6/2005 | Isawa et al. | 244/17.19 |
| 2006/0067822 | A1 * | 3/2006 | D'Anna | 416/98 |
| 2006/0113425 | A1 * | 6/2006 | Rader | 244/17.11 |
| 2007/0170307 | A1 * | 7/2007 | de la Cierva Hoces | 244/7 R |

FOREIGN PATENT DOCUMENTS

WO    WO 2005087588 A1 *    9/2005

OTHER PUBLICATIONS

Office Action issued in EPO 06 745 084.1-2318, Sep. 26, 2008, Zimet, Nachman, et al.

* cited by examiner

ROTARY-WING VEHICLE SYSTEM

RELATED APPLICATIONS

This application is based on provisional application No. U.S. 60/624,941, filed on Nov. 5, 2004.

FIELD OF THE INVENTION

The present invention relates to flying apparatuses generally and more specifically to self-stabilizing rotating flying toys.

BACKGROUND OF THE INVENTION

The passion of flying has accompanied human beings from the early days of the humankind. The well-documented Helical Air Screw drawing of Leonardo Da Vinci in the fifteen-century was an important step towards a vertical take off, hovering and landing flying apparatus. It was only when a light weight powerful enough engine for powering rotating blades become available when Paul Cornu took off vertically in 1907. Vertical flights became easier and smoother when gyro control became available in mid-1940's and became common about a decade later.

A helicopter typically has two rotor blades that are connected through a drive shaft to an engine. The air deflected downwards due to the spinning of the rotor blades provides the lilting power. Rotor blades at the tail of the helicopter are directed in the horizontal plane to provide the anti-torque power that is required in order to prevent the helicopter from rotating due to the spinning main rotor. Changing the main rotor blades attack angle provides horizontal motion according to pilot's commands.

Sikorsky and Kamov first introduced a helicopter with two counter rotating main rotors on a common axis. Eliminating the need for tail rotor blades, the counter-rotating blades provide higher maneuverability and stability.

Flying toys history is even longer than that of flying vehicles. Unlike flying vehicles, flying toys are typically very price-sensitive. They should be stable, easy and safe to fly.

Consequently, Remote control flying toys should be designed to be inherently stable, with safe and durable structure and materials, using low cost components and very simple to manufacture.

SUMMARY OF THE INVENTION

The present invention provides an innovative rotary-wing apparatus that is aeronautically stable, easy to fly and control, very small in size, safe to fly and low cost to produce. In accordance with the present invention a rotary-wing flying apparatus innovative design eliminates the need for gyros and motion sensors, expensive actuators and movable parts, rotor blades with changeable attacking angle, nor a tail rotor. Consequently making it possible to be produced at a very low cost, thus enabling implementations such as toys and other low cost applications. In addition it consists of innovative safety features for the operator and its surroundings making it possible to fly a rotary-wing platform of the current invention even in doors.

Rotary-wing vehicle systems are well known and are being widely used for various mobile applications. The present invention diminishes at least some of the disadvantages associated with methods and solutions of very small helicopters that are designed for stability while maintaining minimal costs, a simple control, a high reliability, robustness and endurance and with no, or minimal need for tuning and adjustments.

In accordance with one aspect of the present invention, there is provided, a coaxial rotary-wing apparatus comprising: at least two sets of lifting blades connected to a main coaxial drive shaft; primary drive means connected to the coaxial drive shaft for driving the at least two sets of lifting blades at the same angular velocity, a first set of the lifting blades being driven by the drive means in a first direction of rotation, and a second set of the lifting blades being driven by the drive means in a second direction of rotation opposite to the first direction; the at least two sets of lifting blades being located one above the other, wherein the center of gravity of the coaxial rotary-wing apparatus is positioned lower than the at least two sets of lifting blades; auxiliary drive means, for driving the coaxial rotary-wing apparatus in at least forwards and backwards directions and for causing the rotary-wing apparatus to perform yawing motions; and control means for controlling the primary and auxiliary drive means.

In another embodiment of the present invention, a coaxial counter rotating rotor drive is used, providing inherent aeronautical stability.

In another embodiment of the present invention, a differential steering provides excellent yaw control, as well as forward/backwards control of the rotary-wing vehicle. A "tank-like" differential steering enables very convenient control of maneuvers even by the layman operator.

It would be appreciated that the inherent design of the blades system of the present invention eliminates the need of using expensive gyros, servos and pitch control means for maintaining flying stability.

In another embodiment of the present invention, using flexible blades with a "rigid type" rotor head for the rotary-wing vehicle provides smooth flying characteristics.

In another embodiment of the present invention, swept forward blades increase flight stability.

In another embodiment of the present invention, a flying vehicle flexible structure is provided, which absorbs the hit energy through a spring like structure of its body.

In another embodiment of the present invention, a blades connection apparatus enables blades to fold back in case of encountering excessive external force. It would be appreciated that the present invention enables exchanging of the blades without screws, or the need for tools.

In another embodiment of the present invention, blades tuning means is provided, which enables collective pitch tuning of a set of rotors using a single button. It would be appreciated that a single knob adjustment enables even lay people to intuitively adjust blades in case a yaw adjusting is needed for holding the rotary-wing flying apparatus direction while hovering or while flying and when no yaw control is externally provided.

It would be appreciated that the rotary-wing flying apparatus of the present invention may be remotely control by an operator.

Yet another embodiment of the present invention provides a manual adjustment of forward/backwards motion while in steady-state. A single button adjusts center of gravity of the rotary-wing flying apparatus to set preferred forward motion immediately after takeoff. It would also be appreciated that the center of gravity may be adjusted for forward motion without applying power to auxiliary differential power propellers, so the rotary-wing vehicle can fly forward in its steady state while saving energy, increasing flight time. Alternatively the center of gravity of the rotary-wing flying apparatus may be set for hovering in steady state and while no power is provided to the auxiliary differential power propellers.

Yet another embodiment of the present invention provides air brakes for stabilizing the rotary-wing flying apparatus in a forward flight.

Yet another embodiment of the present invention provides a tail fin for improved yaw stabilization.

Focusing on cost sensitive flying applications such as toys, cost of materials is very critical. Unlike other micro helicopters, such as the FR-II of Seiko Epson, which uses gyrosensor, the current invention provides great flying stability without using gyro sensors, actuators, or a tail rotor.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
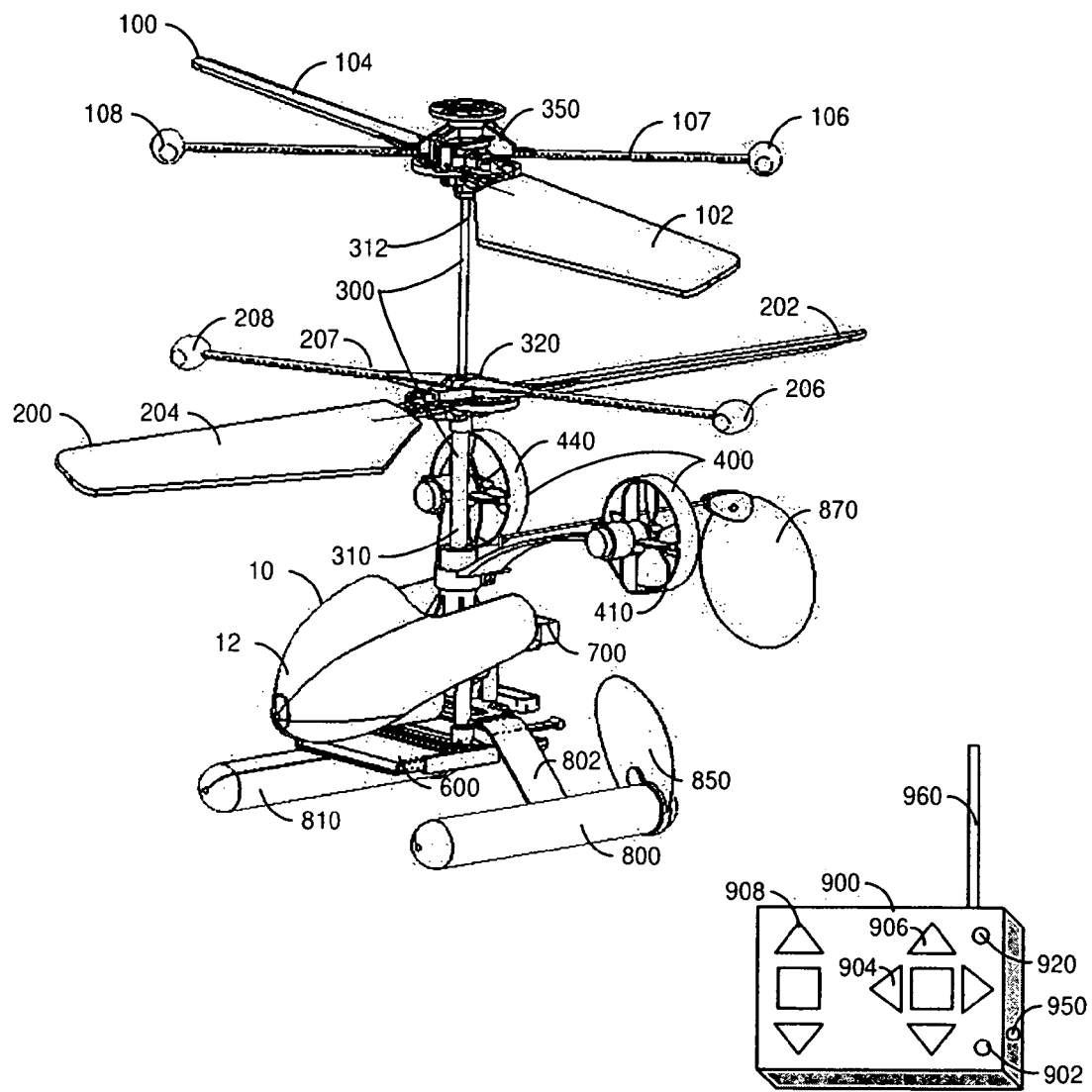
FIGS. 1 and 2 are simplified isometric views illustrating a preferred embodiment of the present invention, including a counter-rotating rotary-wing apparatus.
Figure 2:
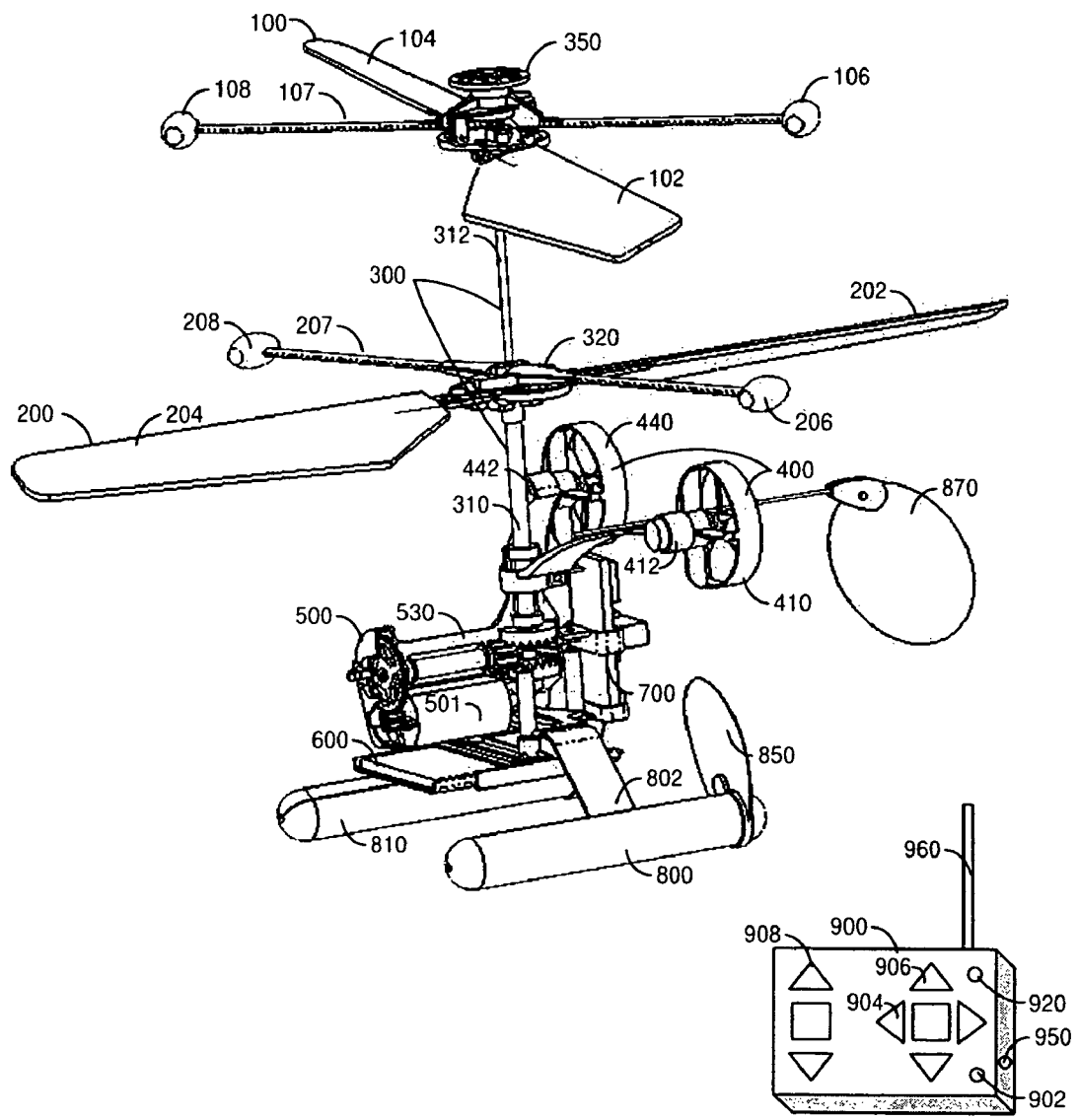

Reference is now made to FIGS. 1 and 2 which are simplified pictorial diagrams illustrating one preferred embodiment of the present invention, a rotary-wing flying apparatus operating in a plurality of applications. The illustrated embodiment of FIGS. 1 and 2 are presented in the context of flying toys, it is understood that this embodiment of the invention is not limited to toys and is equally applicable to other suitable types of small flying objects where cost, stability and ease of use are of importance.

FIG. 1 illustrates a front isometric view of a micro rotary-wing apparatus 10 of a preferred embodiment of the current invention.

A micro rotary-wing apparatus 10 consists of two sets of counter rotating blades, a lower rotor blades system 200 and the upper rotor blades system 100.

A main coaxial drive shaft 300 provides a rotating power to the two sets of counter rotating blades 100, 200. The main coaxial drive, shaft 300 consists of two parts: an outer main drive shaft 310 and an inner main drive shaft 312. Outer main drive shaft 310 provides a rotating power to the lower set of blades 200. Inner main drive shaft 312 provides a rotating power to the upper set of blades 100. The two parts of main coaxial drive shaft 300 rotate at the same speed and in opposite directions. While the outer main drive shaft 310 rotates in one direction, the inner main drive shaft 312 rotates in the opposite direction. A counter rotating movement of the two sets of blades the upper set 100 and lower set 200 cancel each others angular torque.

The lower rotor blades system 200 consists of two blades 202 and 204. The lower blades 202 and 204 are connected to the outer main coaxial drive shaft 310 using a rotor head 320.

The upper rotor blades system 100 consists of two blades 102 and 104. The upper blades 102 and 104 are connected to the inner main coaxial drive shaft 312 using a rotor head 350.

Stabilizing apparatuses are connected to each of the two counter rotating blades systems 100,200. A bell stabilizing apparatus 207 is connected to the lower blade system 200. A bell stabilizing apparatus 107 is connected to the upper blade set 100.

The two blade systems 100 and 200 provide lifting force for the rotary-wing apparatus 10.

A main drive power assembly 500 that is shown in FIG. 1 provides the rotating power to the two blade systems 100 and 200, through main coaxial drive shaft 300.

A main motor 501 provides rotating power through a main gear system 530 to main coaxial drive shaft 300. A counter rotating power is provided by main gear system 530 to the main coaxial drive shaft 300. The inner drive shaft 312 is powered in one direction while the outer drive shaft 310 is powered in the opposite direction.

An auxiliary motors system 400 of a preferred embodiment of the current invention consists of two sets of power assemblies, a left propeller system 410 and a right propeller system 440. The auxiliary left and right propeller systems 410 and 440 provide forward, backwards and yaw movement of rotary-wing apparatus 10.

It is yet another preferred embodiment of the current invention that the propellers of auxiliary motors system 400 are located above the center of gravity of the rotary-wing apparatus 10.

A control unit 700 controls the operation of the rotary-wing vehicle 10. Control unit 700 controls the operation of main drive power assembly 500 and the operation of auxiliary motors system 400. Control assembly 700 may also have remote control capabilities and may also have processing unit and memory. Control assembly 700 may also consist of a receiver for receiving remote control commands. Such a receiver may be of radio frequency (RF), light such as infra-red (IR), or sound such as ultra sound, or voice commands. Control assembly 700 may also consist of a pre programmed flying control, or programmable flying control to be programmed by the user.

A power assembly 600 provides power to all rotary-wing apparatus 10 driving and control units: main drive power assembly 500, auxiliary motor system 400 and control unit 700. Power assembly 600 may be such as a rechargeable battery, simple battery, capacitance device, super capacitor, micro power capsule, fuel cells, fuel or other micro power sources.

A remote control unit 900 may preferably be used by an operator to control rotary-wing vehicle 10 of current invention. Remote control unit 900 has throttle control 908, which is preferably proportional control for controlling the power of the main drive assembly 500, a left/right control 904 and forward/backwards control 906 for controlling the power and rotation direction of the auxiliary motor system 400. Control for left/right and forward/reveres may be of proportional type or non-proportional type. The remote control unit 900 may also have a power switch 902, an indicator 920 for various in actions such as power on/off, charging, battery status, etc. It may have a waves radiation transducer 960 such as RF antenna as shown in case RF is used for transmission of remote control commands. It may also have a charger output 950 for charging the power assembly 600 of micro rotary-wing apparatus 10.

Skids 800, 810 may be attached to micro rotary-wing vehicle to enable it to land on various surfaces such as solid and liquid materials. The skids 800, 810 can be in various shapes and materials such as foam and or plastic. They are connected to the main body of rotary-wing vehicle 10 preferably with a springy structure such as the bars 802, 804.

A canopy 12 as shown in FIG. 1 may cover internal parts of the rotary-wing apparatus 10. A preferred main body structure of the micro rotary-wing vehicle 10 is using a light material for the canopy 12. An alternative main body structure would be using a foam structure for the canopy 12, which would provide a compelling look of the rotary-wing apparatus 10. The canopy 12 would preferably cover internal components of the rotary-wing apparatus 10 such as main driving assembly 500.

In another preferred embodiment of the current invention, the rotary-wing apparatus 10 may also consists of a tail 870 for an improved directional stability.

In yet another preferred embodiment of current invention a rotary-wing apparatus 10 may also consist of air brake 850 that is preferably located below the center of gravity of rotary-wing apparatus 10.

Figure 3A:
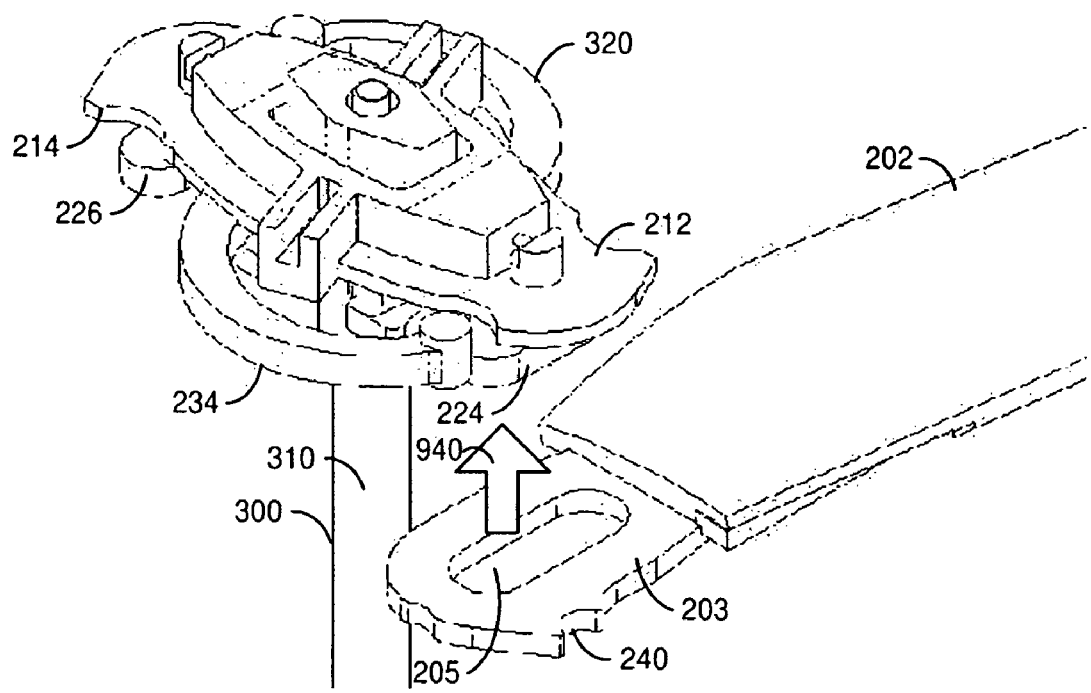
FIGS. 3A, 3B, and 3C are isometric views illustrating a preferred method of connecting rotor blades of a rotary-wing apparatus.
Figure 3B:
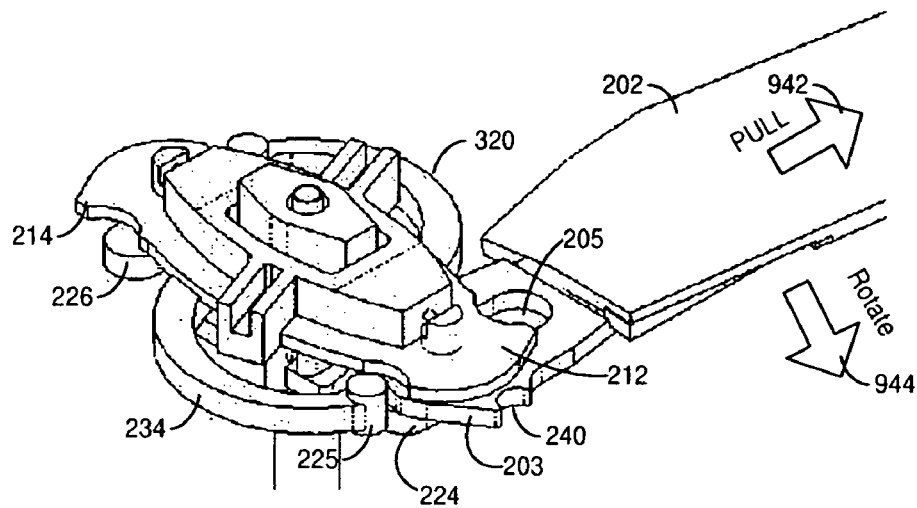
Figure 3C:
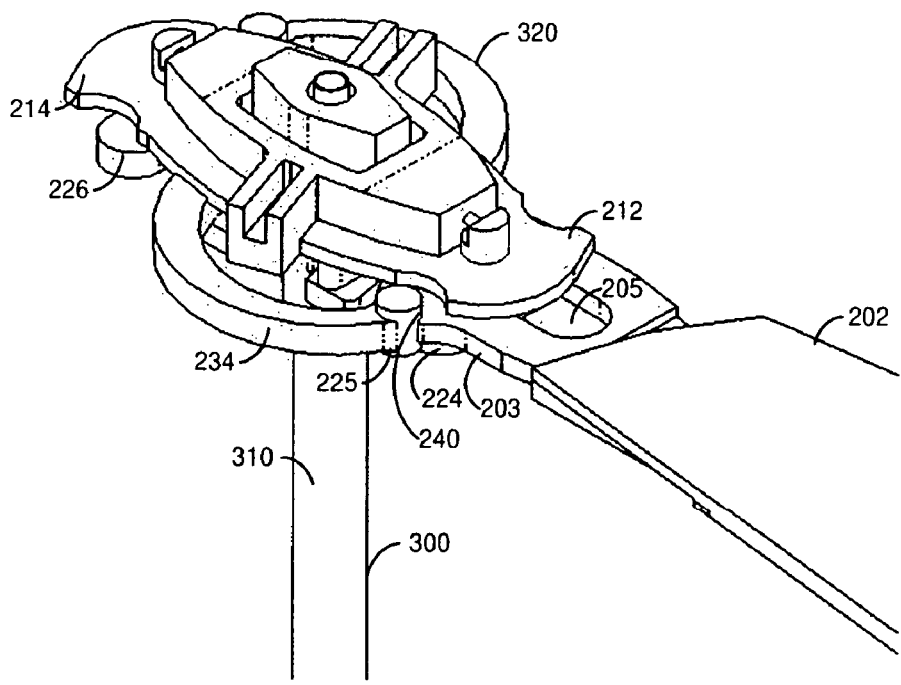

Reference now is made to FIGS. 3A, 3B, and 3C which provide illustrations of one preferred method for connecting rotor blades 202 and 204 of lower blade assembly 200 of rotary-wing apparatus 10. In FIG. 3A, a blade connector 203 is aligned with a locking pivot 224 of blades assembly 200. Arrow 940 shows the direction of inserting a slot 205 of blade connector 203 onto locking pivot 224.

Reference is now made to FIG. 3B. Blade connector 203 is assembled onto blade locking pivot 224 of rotor lower head hub 212 of lower rotor head 320. Blade 202 is now pulled away as shown by arrow 942 from the rotor assembly 212 so spring 234 now pushes blade connector 203 and causes a blade 202 to be held onto the locking pivot 224. Arrow 944 shows the direction the operator needs to rotate blade 202, so blade connector 203 will be locked into its fix fixed position with rotor lower head hub 212 of rotor head 320.

Blade 202 is now manually rotated against spring 234, as shown by Arrow 944. Spring 234 slides over the blade connector 203 using the blade locking pivot 212 as its axis for rotation. Reference is now made to FIG. 3C where blade 102 is now in its "ready to fly" position. Positioning slot 240 of blade connector is held clicked in its position by Pin 225 and slot 240 and by the force of spring 134. Locking other blades 204, 102 and 104 is implemented in a similar manner.

It will be appreciated that blades assembly apparatuses 100 and 200 of the current invention provide an innovative method that is simple to assemble and to replace blades even by a layman in the art of flying machines. Should a low external force be applied on blades 102, 104, 202, 204, the blades will be swept back. By folding back a possible damage is avoided to an external object, or operator, which blades may hit. It would be appreciated that current invention method and mechanism of blades with folding capabilities, provide a high safety method and mechanism, so the probability of an operator of rotary-wing apparatus 10 of the current invention to be damaged by hitting the rotors is significantly lower. It would further be appreciated that the preferred rotor blades folding method of current invention also reduces probabilities for damaging blades 100, 200 themselves by hitting external object.

It would be appreciated that in order to increase safety of rotary-wing vehicle 10, operator and other objects in the surroundings of rotary-wing vehicle 10, blades 102, 104, 202, 204 will preferably be made from a soft and foldable material such as foam, flexible plastic materials, foils, or other soft, and flexible materials and that are strong enough to provide lifting power.

In another preferred embodiment, the invention control unit 700 of FIG. 2 may also consist of means for detecting collision conditions. In case of a collision of blades 100, 200 with external objects, control unit 700 may detect the situation and stop the rotors rotation power. Such collision detection may be implemented by measuring a sudden increase of main motor 500 current, which is a result of an external force rather than a result of a user command for increasing throttle.

It would be appreciated that the method of connecting blades 100, 200 of the current invention enables fast and easy connection and disconnection of rotor blades 100, 200 from the rotor heads 320, 350 without fasteners and tools.

It would also be appreciated that the rotor blades are clickable into their position and therefore no further adjustments are needed. Another preferred embodiment of the current invention uses the same spring that holds the blade in its position so that it will not fold while the rotor accelerates, to enable blade folding in case the blade hits an external obstacle and provides additional safety.

It will be further appreciated that the present invention includes variations and modifications, which would function as fast connection of blades 100, 200 without the need of tools and a fast sweep back or blades disconnection due to operation of external force.

Figure 4A:
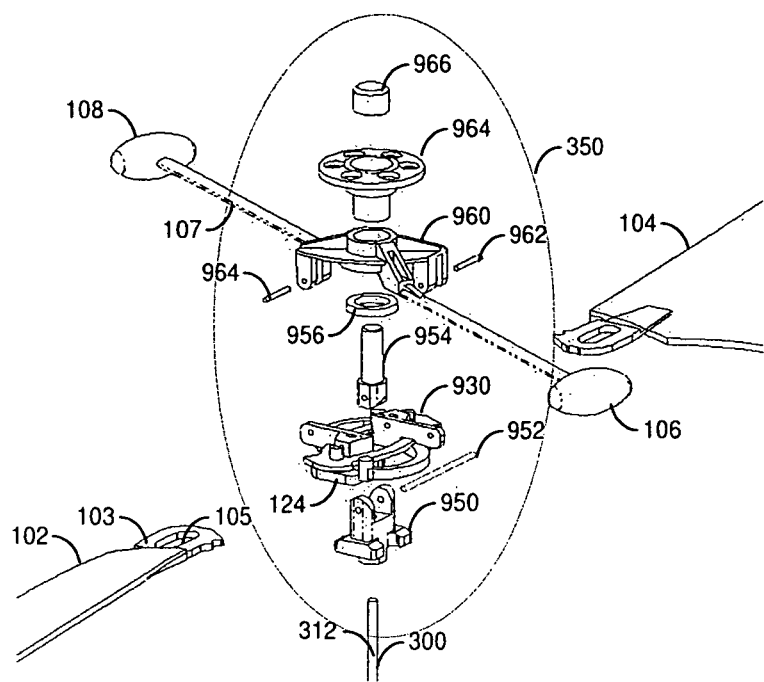
FIGS. 4A, 4B, 4C, and 4D are exploded views of parts and assembly of the upper rotor head showing a yaw trimming control knob for a collective pitch change of the upper blades.

Reference is now made to FIG. 4A, which is an exploded view of parts and assembly of upper rotor head 350. A yaw trimming control knob 964 enables a collective pitch change of upper blades 102, 104. Yaw trimming control knob 964 may have an internal thread. It can be manually turned by an operator of the rotary-wing apparatus 10. Turning yaw trimming control knob 964 clockwise over contra bolt 954, pushes collective control horn 960 downwards. Control horn 960 is connected to rotor head hub 930 using connecting pins 962, 964. Consequently rotor head hub 930 is twisted. As a result, the pitch of rotor blades 102 and 104, which are connected to rotor head hub 930, is increased collectively.

Rotor head hub 930 is of a "rigid" type therefore it cannot titter; as a result the pitch axis of rotor head hub 930 is always kept perpendicular to main drive shaft 300, enabling rotor forces to be transferred to main drive shaft 300.

Rotor head hub 930 can freely rotate around pitch axis 952, enabling bell assembly 107 to stabilize rotary-wing apparatus 10.

Similarly turning yaw trimming control knob 964 counterclockwise over contra bolt 954, pulls collective control horn 960 upwards thus reducing pitch angles of rotor blades 102 and 104.

Upper rotor 100 rotates counterclockwise. By turning yaw trimming control knob 964 clockwise, the increased pitch of upper rotor blades 100 increases the moment that is transferred to the rotor hub 930 of upper rotor head 350. The increased moment causes rotary-wing apparatus 10 to yaw clockwise. As a result, turning yaw trimming control knob 964 clockwise causes rotary-wing apparatus 10 to yaw clockwise.

The above-described yaw trimming method of the present invention enables an operator of rotary-wing apparatus 10 to prevent undesired yaw movements of rotary-wing apparatus, 10 while auxiliary motors 400 of FIG. 1 are inactive.

Figure 4B:
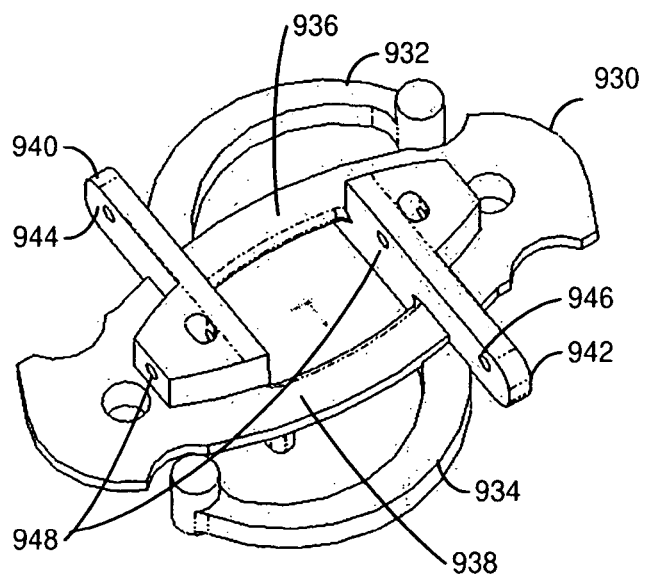

Reference is now made to FIG. 4B, which is an illustration of rotor head hub 930 of rotor head 350 of FIG. 4A. Rotor head hub 930 consists of locking springs 932,934 that hold blades 102, 104 at the correct position; pitch control horn 940, 942 for receiving force of collective control horn 960 of FIG. 4A; flexible strips 936, 938, which carry centrifugal forces of blades 102, 104 and also enable the change of angle between blades 102, 104. Rotor head hub 930 can freely pivot around pitch axis 952 of FIG. 4A that is inserted though holes 948 of rotor head hub 930.

Figure 4C:
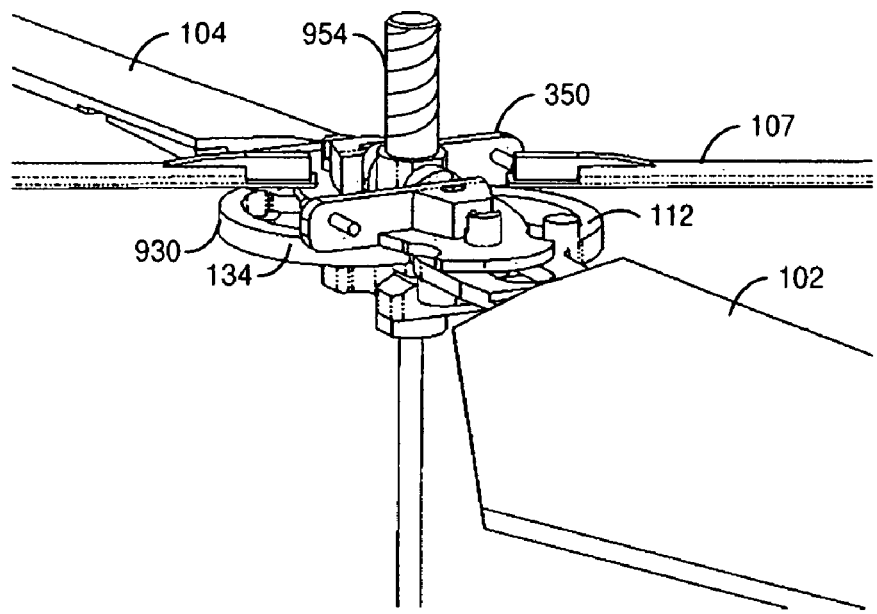

Reference is now made to FIG. 4C, which is an illustration of a partially assembled upper rotor head 350 and where contra bolt 954 can clearly be seen.

Figure 4D:
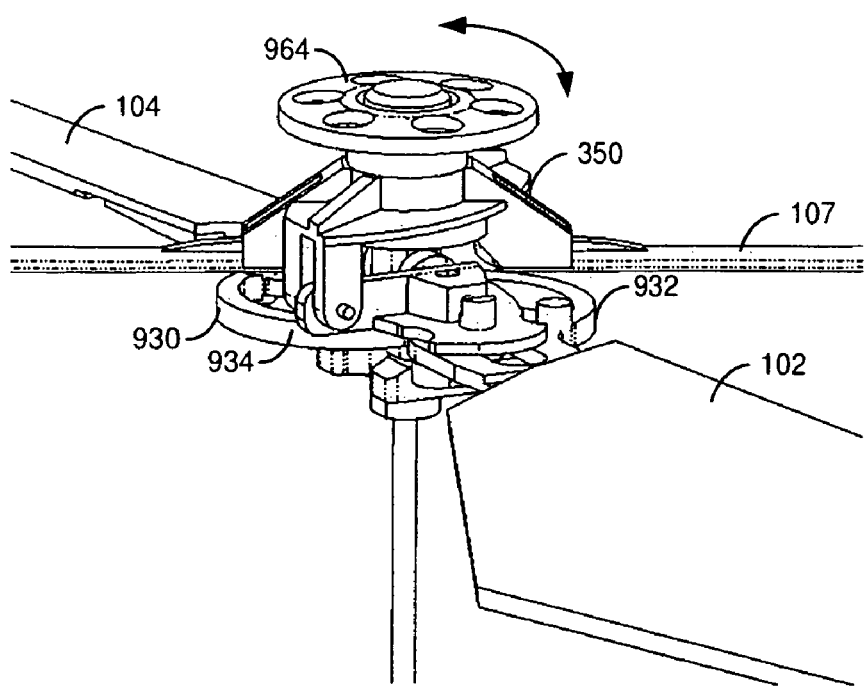

Reference is now made to FIG. 4D, which is an illustration of a complete assembly of upper rotor head 350 and where yaw trimming control knob 964, which enables a collective pitch change of upper blades 102, 104 is located at the top of upper rotor head 350.

Figure 5:
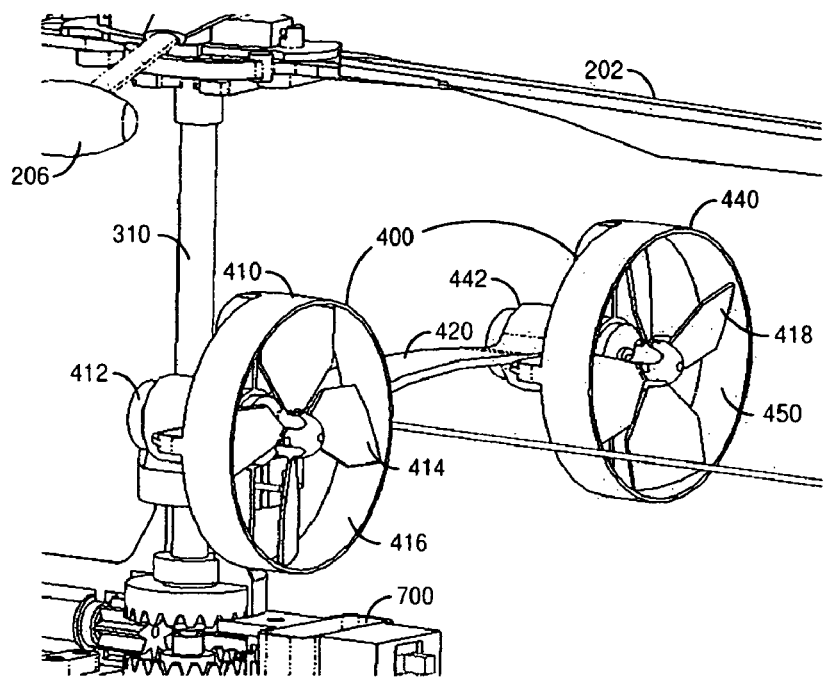
FIG. 5 is an isometric view illustrating an auxiliary power system for driving the rotary-wing apparatus forward/backwards/yaw.

Reference is now made to FIG. 5, which describes yet another embodiment of the current invention. An auxiliary power system 400 consists of a left power assembly 410 and a right power assembly 440. Each consists of a propeller and motor. Left power assembly 410 consists of a motor 412, propeller 414 and protecting shield 416. Right power assembly 440 consists of a motor 442, propeller 418 and protecting shield 450.

Propellers 414, 418 provide air thrust in a desired direction when spinning. Propellers 414, 418 can be rotated clockwise and anticlockwise independently and according to commands received from control assembly 700.

Propellers 414, 418 are used to move rotary-wing apparatus 10 forward, backwards and in yaw (rotate horizontally clockwise or counterclockwise) movements. Auxiliary motors 412, 442 provide the rotation power of auxiliary propellers 414, 418. Protective shields 410, 450 are used for protecting propellers 414, 418 and auxiliary motors 412, 442 against external damage and for safety reasons. Auxiliary motors 412, 442 are connected to the main rotary-wing vehicle's frame by means of flexible connecting rods 420.

Another preferred embodiment of the current invention are auxiliary power systems 412, 442 that are located above the gravity center of rotary-wing vehicle 10 providing a correct pitching moment in addition to providing direct vector thrusts for directional control. It would be appreciated that preferred position of auxiliary power systems 412, 442 contribute to aeronautical stability of rotary-wing vehicle 10.

Control unit 700 of FIG. 2 controls the auxiliary motors 412, 442 movements.

Figure 6:
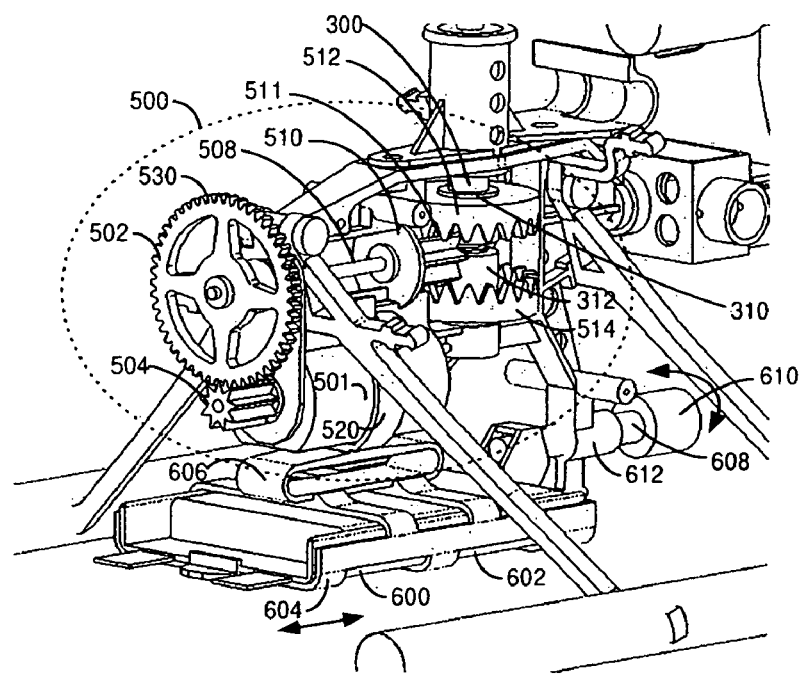
FIGS. 6 and 7 are isometric views illustrating the main drive system of a rotary-wing vehicle.
Figure 7:
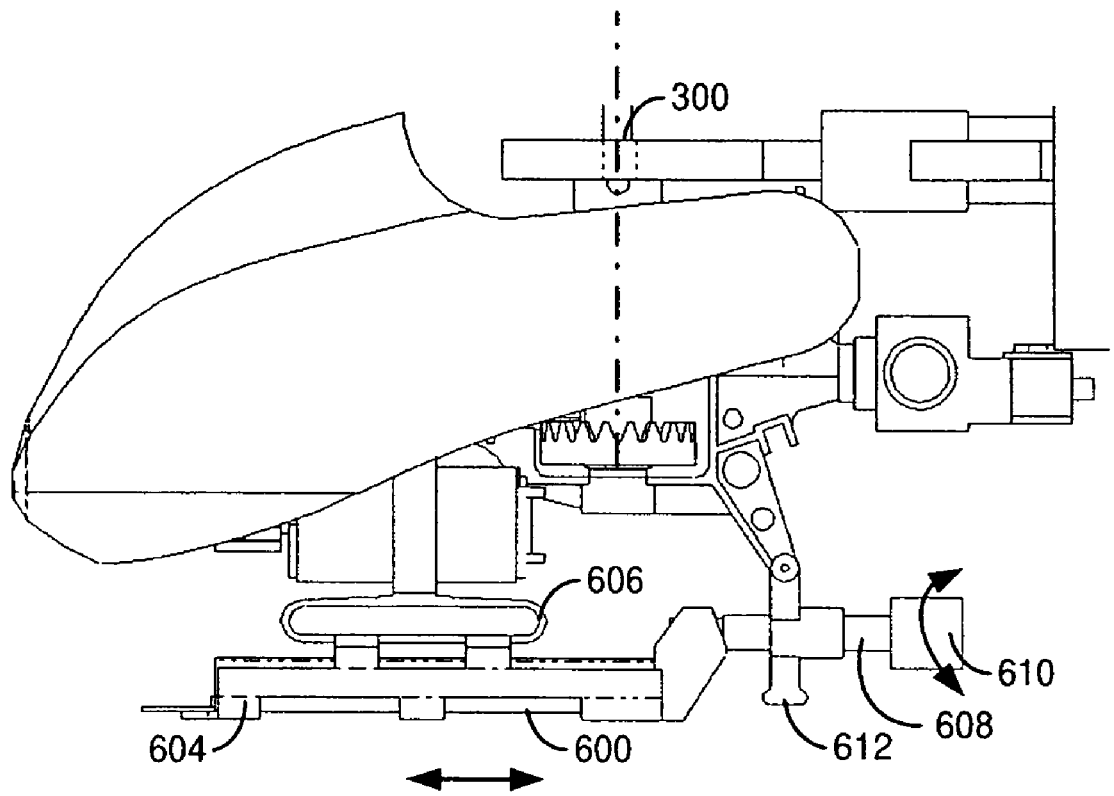

Reference is now made to FIGS. 6 and 7, which describe main drive system 500 of rotary-wing vehicle 10. Main rotary-wing vehicle drive system 500 consists of at least one driving motor 501 connected to a main gear system 530. Main gear system 530 is also connected to main rotor drive shafts 300 of FIG. 6 and of FIG. 2. A main gear system 530 consists of primary reduction gears 502, 504 and a counter rotating gear arrangement 511 consisting of gears 510, 512, 514 that are powered from primary reduction gears 502, 504 via an auxiliary drive shaft 508. Gear 514 provides rotating power through drive shaft 312 in one rotating direction while gear 512 rotates drive shaft 310 at the same angular velocity and with an opposite direction.

It would appreciated that this embodiment of the current invention uses gearbox 530 to counter rotate coaxial main drive shafts 300, and rotate upper and lower rotor assemblies 100, 200 at the same angular speed regardless of motor power. Consequently, the yaw of rotary-wing apparatus 10 of the current invention is not affected by changes in power of main motor 501. It would also be appreciated that by suing the above-described embodiment of the current invention there is no need for additional active yaw stabilization means. No additional active stabilization means such as gyro sensors, servo systems, or additional motors enables reduction of the cost of producing the rotary-wing vehicle 10 to a consumer products cost level such as toys costs. As explained in FIGS. 4A, 4B, 4C, and 4D, a simple one-control knob 964, which is yet another embodiment of the current invention, enables tuning of a possible drifting yaw movement due to a residual difference in angular torque of upper and lower rotors systems 100 and 200.

A power source tray 604 is connected to rotary-wing vehicle 10 via a flexible structure 606. Power source 600 is held within the power source tray 604. Power source 600 is preferably a rechargeable battery, or may also be a battery, a capacitor, a super capacitor, a fuel cell, small fuel engine, and other small-condenses power sources.

Referring now to FIG. 7, which shows yet another embodiment of the current invention, a method and system for controlling forward motion of rotary-wing vehicle 10 of the current invention when power is not applied to auxiliary power system 400 of FIG. 1. In accordance with the current invention, an ability is provided to move the power source assembly 604 back and forth by simple mechanical means in order to change flight characteristics. A center of gravity of rotary-wing vehicle 10 of the current invention can be adjusted inline with main rotor drive shaft 300 to enable rotary-wing vehicle 10 to hover steadily when power is not applied to auxiliary power system 400 of FIG. 1.

Alternatively by moving power source assembly 604 forward, the center of gravity of rotary-wing vehicle 10 may be adjusted ahead of the main rotor drive shaft 300 central line. In such case rotary-wing vehicle 10 will have a slow forward flight when auxiliary power 400 of FIG. 1 is not operating.

By moving power source assembly 604 even further forward, the center of gravity can be adjusted further ahead of the main rotor drive shaft 300 central line, resulting in a faster forward flight when no power is applied to auxiliary power 400, thus with less energy power consumption. Adjusting a simple knob 610 by displacement mechanisms, such as a screw mechanism 608, controls the center of gravity backwards/forwards relative to main rotor drive shaft 300 central line. Alternatively, a sliding apparatus may be used for the center of gravity location control.

Figure 8A:
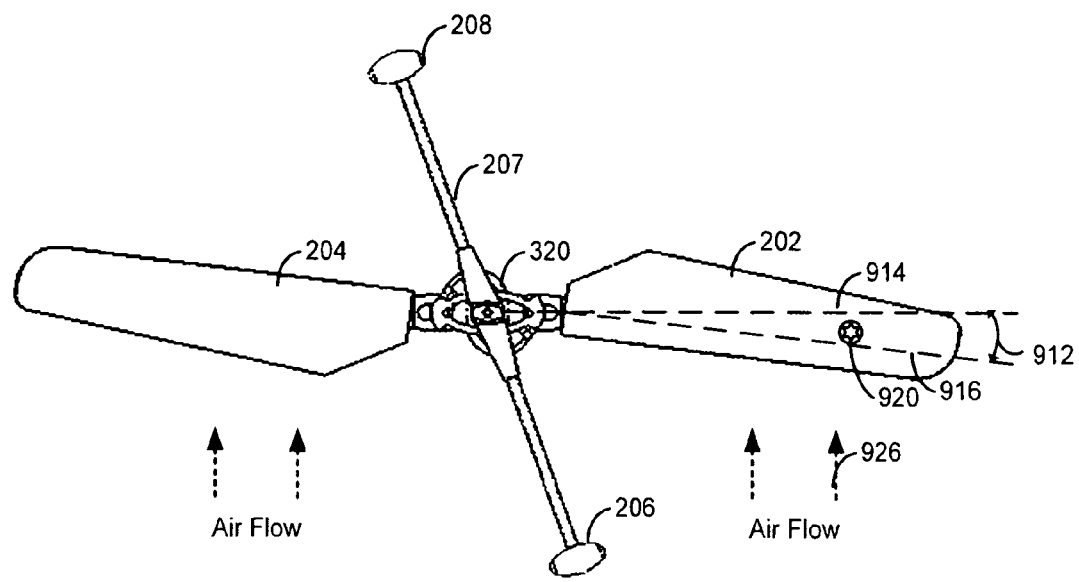
FIGS. 8A and 8B are diagrams illustrating swept forward blades of a rotary-wing vehicle.
Figure 8B:
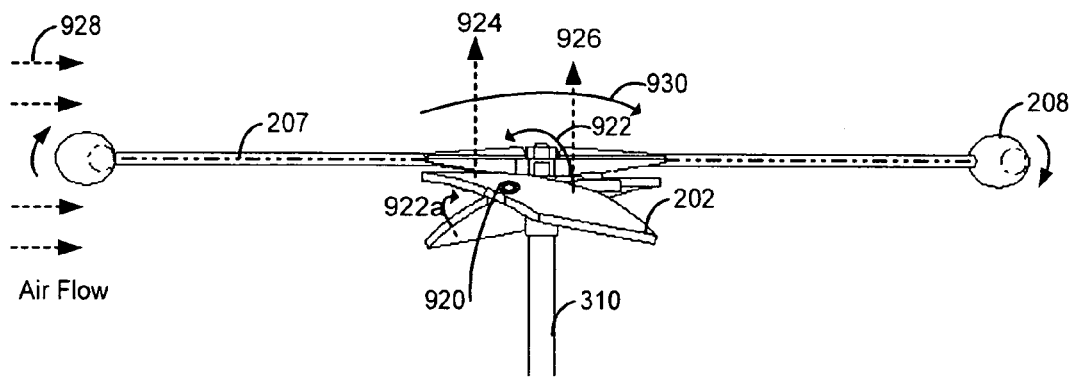

Reference is now made to FIGS. 8A and 8B, which are illustrations of yet another preferred embodiment of the current invention. FIG. 8A is an upper view of blades 202 and 204. One preferred embodiment of the current invention is main rotor blades 202 and 204 (and similarly main rotor blades 102, 104 of FIG. 1) with a lifting force center 920, which is located ahead of pitch axis 914. FIG. 8A shows one such preferred implementation, where blade set 202, 204 is swept forward.

It would be appreciated that by implementing forward swept blades of the current invention, the advancing blade lift 924 creates a blade pitching moment around the pitch axis which is opposite of blade pitching moment 922 of FIG. 8B, therefore, the net pitching moment of the blades around the rotor head pitch axis is zeroed or positive with respect to the direction of flight. Positive moment in that case means a moment that attempt to tilt back the rotor head when the pitch axis is perpendicular to the direction of flight. This pitch moment affects the fly bar 207 plane of rotation in a desired manner and improves flight stability.

At any wind speed 928 other than zero (hovering) the pitching moment of the advancing and retarding blades does not cancel each other. If the blades are not swept forward and have their lift center aligned with the pitch axis then the increased pitching moment of the advancing blade sums up with the decreased pitching moment of the retarding blade and will cause such a net pitching moment on the rotor head that will attempt to tilt the fly bar forward into the wind. As a result, acceleration and diverging into a crash may occur. It would be appreciated that with forward swept blades of present invention, net pitch moments 930 that affect the fly bar may be zeroed, or even in the opposite direction, thus it is possible to eliminate that phenomena. The lift vector of such blades, being aft of the pitch axis, will provide a pitching moment in an opposite direction to the blade natural pitching moment and cancel the effect. The correct forward swept angle for smooth and stable flying may be determined according to the specific blade shape and blade set arrangement.

A forward swept blade has also an imaginary axis, which acts as a delta hinge, which reduces the blade pitch when it flaps up, thus adding to the overall stability.

Figure 9:
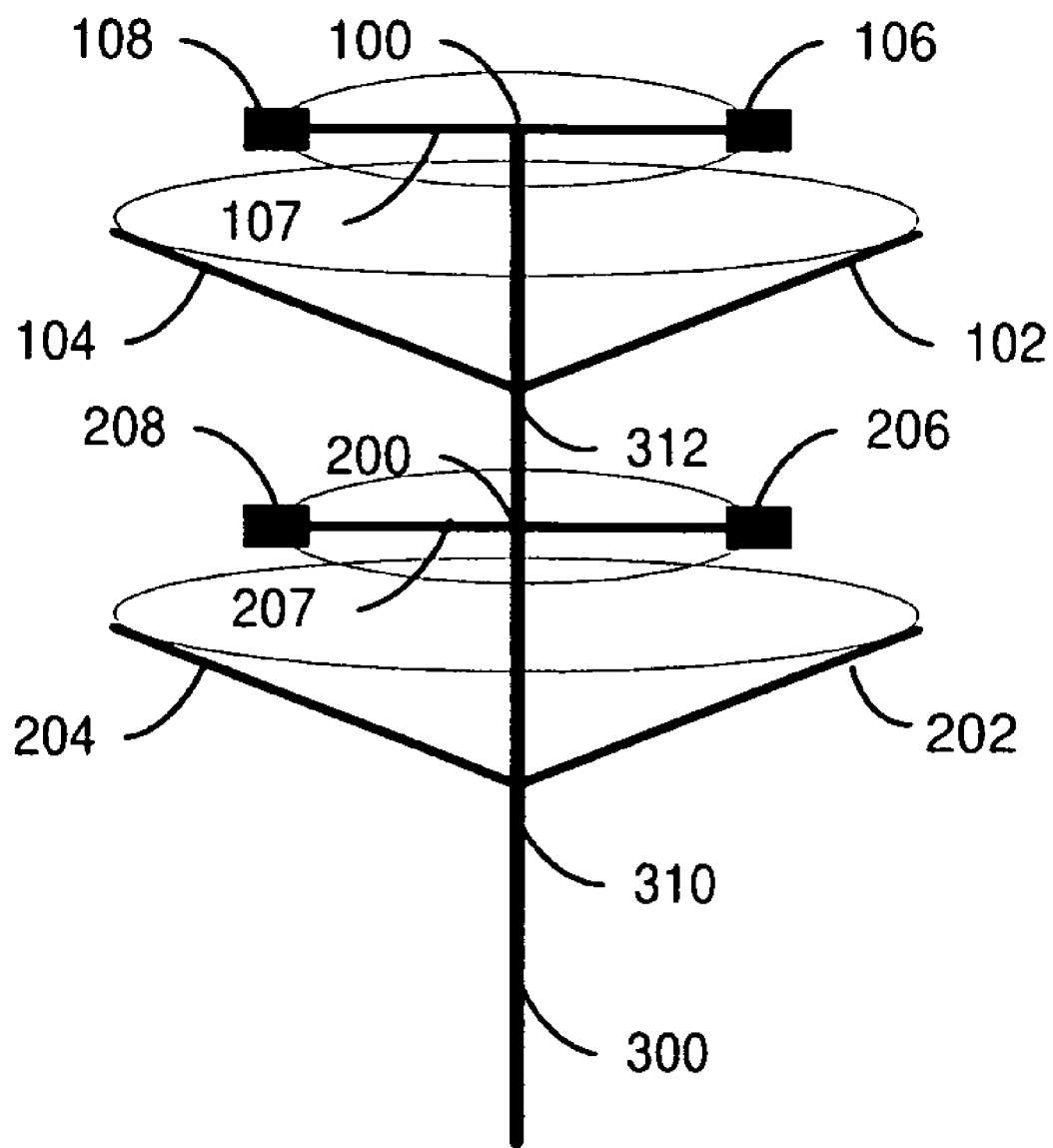
FIG. 9 is a simplified illustration of rotors and stabilizing apparatus.

Reference is now made to FIG. 9, which is an illustration of yet another preferred embodiment of the current invention.

Upper rotor blade set 100, and lower rotor blade set 200, are designed to be different from each other. The two different designs are meant to create different conning angles between the upper and lower rotor blades while flying.

It is yet another embodiment of the current invention that a difference in upper 100 and lower 200 rotor blades may be in their geometry and shape design such as different blade profile, or twist, mass of the blades, blade material type, blade outline shape, different blade speed, and/or any combination of the above options.

The different conning angles combine with the forward swept blades and rigid rotor heads, provide pendulum free flight characteristics.

Figure 10A:
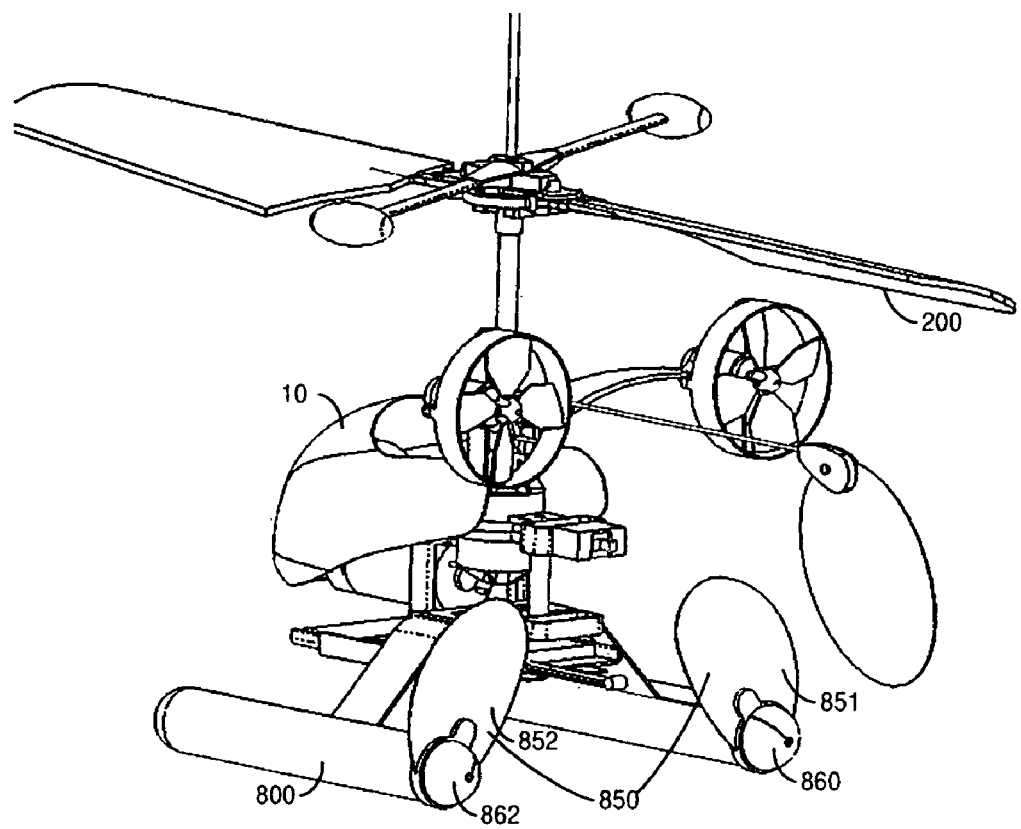
FIGS. 10A and 10B are isometric views illustrating the air brakes apparatus for a better rotary-wing apparatus flying stabilization.
Figure 10B:
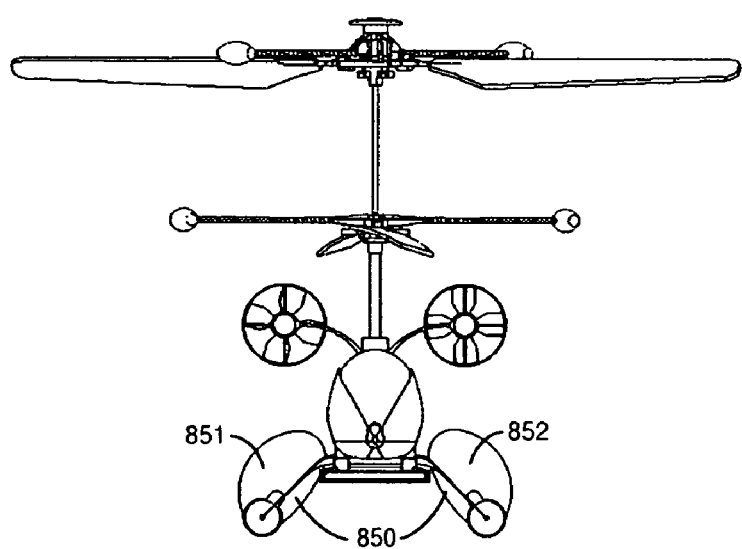

Reference is now made to FIGS. 10A and 10B, which show another method for improving flight quality of yet another embodiment of the current rotary-wing vehicle 10.

Air brakes 850 positioned below the center of gravity (CG) of rotary-wing vehicle 10 create a down pitching moment. With proper selection of the brake size and distance from CG, it is possible to achieve an almost level flight at a speed range of rotary-wing vehicle 10 of present invention.

It would be appreciated that adding "pitch up resistance brakes" 850 to a rotary-wing vehicle 10 enables a much smoother flight, and minimizes swinging due to pitch-up that may be created by the forward movement of the rotary-wing vehicle 10. Pitch up resistance brakes 851, 852 function as air brakes. Air brakes 850 of the present invention are located below center of gravity (CG) of rotary-wing vehicle 10. Preferably air brakes 850 may be added at the lowest possible place to achieve maximum pitching down moment as speed increases. Such location may be at skids 800. As a result, while the main rotors 100, 200 pitch up as speed is picking up, the air brakes 850 keep the rest of the rotary-wing vehicle 10 level or at just at a slight pitch-up angle. With proper selection of pitch-resistance brakes size, a smooth and constant forward speed may be achieved at much higher speeds then without them. Air brakes 850 may be connected by a fixed or dynamic connection.

Figure 11A:
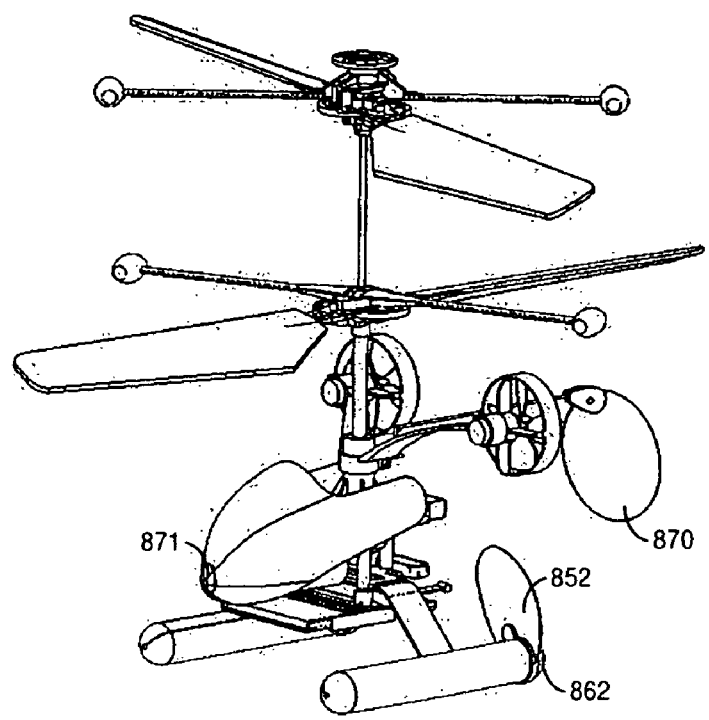
FIGS. 11A and 11B are isometric views illustrating tail apparatuses and operation.

Reference is now made to FIG. 11A, which, shows another method for improving flight quality of yet another embodiment of the present rotary-wing vehicle 10, a method for yaw damping that can be used with rotary-wing vehicle 10 by the use of a fixed tail fin 870 (fixed rudder). Fixed tail fin 870 also creates a "windmill" effect, which will point the rotary-wing vehicle 10 nose 871 onto the flying direction while reducing the possibility of flying sideways.

In yet another embodiment of the present invention, dynamic air brakes 851, 852, can be used for steering left/right of rotary-wing vehicle 10. Actuators 860, 862, such as solenoids, can change air brakes 851, 852 position to increase/decrease the air resistance changing flight direction. It would be appreciated that using this steering method rotary-wing vehicle 10 may use only one auxiliary motor. An auxiliary forward/backwards motor will be centered aligned with the main rotor coaxial shaft as shown in FIG. 11B.

Figure 11B:
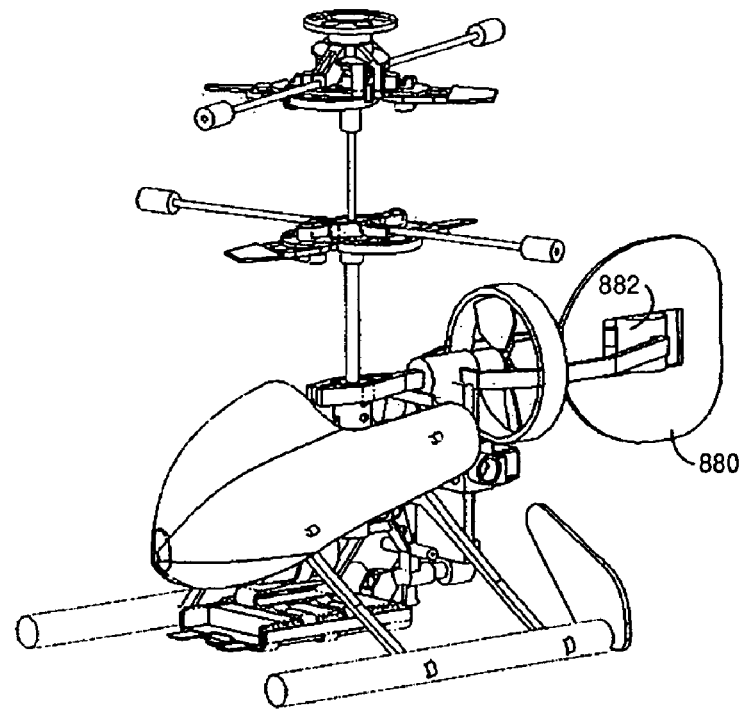

Reference is now made to FIG. 11B, which shows yet another innovative method for steering left/right the Rotary-wing vehicle 10. An actuator 882 controls a steering tail 880. Operator may control the steering tail by controlling the steering actuator 882.

Referring again to FIG. 1, body 12 of rotary-wing apparatus 10 may be made of foam, or possibly a low weight material such as thin lightweight plastic, or cardboard. Skids 800 are made from foam, or other lightweight materials and rotor blades 100, 200 are made of foam and or cardboard, or other lightweight and flexible materials.

Rotary-wing apparatus 10 may be controlled by remote controller 900, such as RF remote control unit; alternatively infra-red (IR), or sound control, such as ultra sound remote controllers, may control it. It may also be programmed to operate with no remote controls.

It is appreciated that rotary-wing vehicle embodiments of the present invention are typically capable of stable flying forward and backwards, and perform clockwise and counter-clockwise yaw maneuvers. It is further appreciated that elimination of a need for movement and acceleration sensors reduces the cost of the rotary-wing vehicle and makes it affordable for consumer products such as toys.

It is further appreciated that the rotary-wing vehicle counter rotating blades provide inherent aeronautical stability. Its intuitive flying control enables a layman user to fly a low cost rotary-wing vehicle with very minimal training.

It is further appreciated that the rotary-wing vehicle is designed for safe use even in doors. The rotary-wing vehicle is made of elastic materials; main rotor blades are flexible and fold back in case of encountering an external force; low power motors are used; motors may halt on detection of external force.

It is further appreciated that the rotary-wing vehicle requires minimal, or no adjustments. Should a yaw or hovering tuning be required, a simple manual adjustment is made possible by simple means such as single knob.

It is further appreciated that differential "tank-like" steering of the rotary-wing vehicle is very convenient, provides good yaw control, as well as forward/backwards control of the rotary-wing vehicle flight maneuvers.

It is further appreciated that using the same power source for rotating counter-rotating blades of the rotary-wing vehicle eliminates possible drifts in blades behavior over time, such as when two different power sources are used for rotating the counter-rotating blades. Consequently yaw stability over time is significantly better.

It is further appreciated that elimination of dynamic main blades pitch control such as actuators, such as used with common helicopters, significantly simplifies the rotary-wing vehicle design, reduces its cost, and makes it more robust and reliable.

It is further appreciated that elimination of a tail propeller, such as used with common helicopters, simplifies the rotary-wing vehicle design, reduces cost, and increases reliability, stability and maneuverability.

It will be appreciated by persons skilled in the art that the present invention is not limited by what has been particularly shown and described hereinabove. Rather the scope of the present invention includes both combinations and sub combinations of the various features described hereinabove as well as variations and modifications which would occur to persons skilled in the art upon reading the specification and which are not in the prior art.

The invention claimed is:

1. A coaxial rotary-wing apparatus comprising:
   at least two sets of lifting blades connected to a main coaxial drive shaft;
   primary drive means connected to said main coaxial drive shaft for driving the at least two sets of lifting blades at the same angular velocity, a first set of said lifting blades being driven by said primary drive means in a first direction of rotation, and a second set of said lifting blades being driven by said primary drive means in a second direction of rotation opposite to said first direction;
   the at least two sets of lifting blades being located one above the other, wherein the center of gravity of the coaxial rotary-wing apparatus is positioned lower than the at least two sets of lifting blades;
   a plurality of auxiliary drive means, comprising propeller drives for driving the coaxial rotary-wing apparatus in at least forwards and backwards directions while in flight; and
   control means for controlling said primary and auxiliary drive means, said control means comprising differential left/right steering and forwards/backwards steering means for providing commands to each of said auxiliary drive means to control power and rotational direction of each of said auxiliary drive means for causing said rotary wing apparatus to move in forwards and backwards directions and to perform yawing motions while in normal and high speed forwards and backwards flight.

2. The coaxial rotary-wing apparatus of claim 1, wherein said control means controls the velocity at which said primary drive means is able to drive said at least two sets of lifting blades.

3. The coaxial rotary-wing apparatus of claim 1, wherein said propeller drives comprise left and right propeller drives oppositely located on the left and rights sides of said coaxial rotary-wing apparatus respectively, and wherein said left and right propeller drives face the direction of flight of said rotary-wing apparatus, and wherein said left and right propeller drives are located above the center of gravity of said coaxial rotary-wing apparatus.

4. The coaxial rotary-wing apparatus of claim 1, wherein a bell-stabilizing means is connected to each of said at least two sets of lifting blades.

5. The coaxial rotary-wing apparatus of claim 1, wherein each of the at least two sets of lifting blades is connected to a rigid rotor head, said rigid rotor head allowing only pitch movements of the at least two sets of lifting blades.

6. The coaxial rotary-wing apparatus of claim 1, wherein each of said lifting blades has a lifting force center located forward of a pitch axis connecting said lifting blades to the main drive shaft.

7. The coaxial rotary-wing apparatus of claim 1, wherein said lifting blades are swept forward.

8. The coaxial rotary-wing apparatus of claim 1, wherein the upper set of said at least two sets lifting blades has a first set of blade characteristics that is different from a second set of blade characteristics belonging to the lower set of said at least two sets of lifting blades.

9. The coaxial rotary-wing apparatus of claim 8, wherein the first set of blade characteristics differs from the second set of blade characteristics in at least one blade characteristic selected from the group of blade characteristics consisting of blade geometry or shape, blade twist, blade mass, blade material, blade speed, and combinations thereof.

10. The coaxial rotary-wing apparatus claim 1, including air brake means, wherein said air brake means is located below the center of gravity of said coaxial rotary-wing apparatus.

11. The coaxial rotary-wing apparatus of claim 10, wherein said air brake means is dynamically controllable for use in left/right steering of the coaxial rotary-wing apparatus.

12. The coaxial rotary-wing apparatus of claim 1, including a tail fin to provide improved directional stability.

13. The coaxial rotary-wing apparatus claim 1, including yaw trimming means connected to at least one set of said at least two sets of lifting blades, and wherein said yaw trimming means is adapted to collectively adjust the pitch of all lifting blades in said at least one set of lifting blades.

14. The coaxial rotary-wing apparatus claim 1, wherein said lifting blades are removably connected to a rotor head, said rotor head being connected to said main coaxial drive shaft.

15. The coaxial rotary-wing apparatus of claim 14, wherein said rotor head includes a spring mechanism to hold said lifting blades in place during flight.

16. The coaxial rotary-wing apparatus of claim 15, wherein said spring mechanism is adapted to allow said lifting blades to release and fold back when an external force exceeding a predetermined amount and counter to the direction of rotation of said lifting blades is applied to said lifting blades.

17. The coaxial rotary-wing apparatus of claim 14, wherein said rotor head is adapted to allow said lifting blades to release and fold back when an external force exceeding a predetermined amount and counter to the direction of rotation of said lifting blades is applied to said lifting blades.

18. The coaxial rotary-wing apparatus of claim 1, including a collision detection means for detecting when an external force exceeding a predetermined amount and counter to the direction of rotation of said lifting blades is applied to said lifting blades and for stopping rotation of said lifting blades in response thereto.

19. The coaxial rotary-wing apparatus of claim 1, including means for selectively adjusting the center of gravity of the coaxial rotary-wing apparatus forwards and backwards between a first position that is inline with said main coaxial drive shaft and a second position located in a forward direction from said main coaxial drive shaft, thereby causing the coaxial rotary-wing apparatus to move in said forward direction.

20. The coaxial rotary-wing toy of claim 1, wherein said control means is remotely controllable.

21. The coaxial rotary-wing apparatus of claim 1, wherein the commands provided by the steering means comprise commands that control the propeller drives for rotating a first of said auxiliary drive means in a direction opposite the other of said propeller drives to perform yawing motions.

* * * * *